United States Patent [19]

Klems

[11] Patent Number: 5,175,916
[45] Date of Patent: Jan. 5, 1993

[54] LOCATOR STRIP AND METHOD FOR POSITIONING FABRIC COVERS ON A FOAM CUSHION

[75] Inventor: William F. Klems, Troy, Mich.

[73] Assignee: Lear Seating Corporation, Southfield, Mich.

[21] Appl. No.: 865,911

[22] Filed: Apr. 9, 1992

[51] Int. Cl.[5] .............................................. B68G 7/00
[52] U.S. Cl. ..................................... 29/91.5; 29/91.7; 112/417; 112/418
[58] Field of Search ................. 29/91.1, 91.2, 91.3, 29/91.4, 91.5, 91.6, 91.7, 91.8, 413; 297/452; 112/417, 418

[56] References Cited

U.S. PATENT DOCUMENTS

| | | | |
|---|---|---|---|
| 3,316,685 | 5/1967 | Hensel | 29/413 X |
| 3,927,459 | 12/1975 | Haytayan | 29/413 |
| 4,765,045 | 8/1988 | Selbert et al. | 29/91.1 |
| 4,885,828 | 12/1989 | Kozlowski | 29/91.5 |

Primary Examiner—Timothy V. Eley
Assistant Examiner—C. Richard Martin
Attorney, Agent, or Firm—Reising, Ethington, Barnard, Perry & Milton

[57] ABSTRACT

A locator strip (10) accurately positions upholstering fabric (12) upon a seat cushion (16) in the manufacture of seats. The locator strip (10) includes an array of U-shaped pockets (30) along one edge which are separated by finger-like projections (32). A thin filament (40) is fixedly attached to the distal ends (34) of the projections (32) and is formed with notches (39) or cuts (39') between the projections (32). The locator strip (10) is sewn between the edges (18,20) of two fabrics (12,14) with thread (36) passing through the pockets (30) and around the projections (32). The locator strip (10) functions to guide the edges (18,20) of the two fabric covers (12,14) into an elongated slot (22) in the cushion (16). After the fabric covers (12,14) have been bonded to the cushion (16), the locator strip (10) is pulled against the stitches and the thin filament (40) yields at the notches (39) or cuts (39') and bends around the stitches so that the entire locator strip (10) is removed from the two covers (12,14) and the cushion (16) in one piece.

5 Claims, 4 Drawing Sheets

LOCATOR STRIP AND METHOD FOR POSITIONING FABRIC COVERS ON A FOAM CUSHION

TECHNICAL FIELD

The subject invention relates to a method and assembly for upholstering a foam cushion member with two fabric covers, and more particularly to locating the sew seam of the two covers in a predetermined position on the cushion member.

BACKGROUND ART

The covering of foam cushion members with fabric for use in vehicular seats is commonly performed with automated upholstering equipment. For aesthetic purposes, it is frequently desirable to cover the cushion with two or more fabrics of different colors, patterns, etc., which have been arranged in an attractive fashion. The two or more fabric pieces are generally sewn together along their edges, with the sew seam slightly recessed into the cushion for comfort. During an automated upholstering process, however, the fabric covers have a tendency to shift out of the proper orientation on the cushion and thus mislocate the sew seams of the two or more fabrics upon the cushion.

The prior art U.S. Pat. No. 4,765,045 to Allen J. Selbert, issued Aug. 23, 1988, discloses the use of a plastic locator strip which is sewn between two pieces of fabric covering at the sew seam. The locator strip is adapted to be held in an automated tool for positively positioning the sew seam of the two fabrics into the proper orientation on the cushion. After the upholstering process is complete, the locator strip is torn from the fabric by disjoining at a pinched and perforated area thereby leaving a non-removable solid base of the locator strip underneath the sew seam which is permanently imbedded in the cushion. This reference discloses an inherently deficient upholstering process in that the solid base portion is left imbedded underneath the fabric covers, which is bothersome and uncomfortable to sit on or lean against.

The U.S. Pat. No. 4,885,828 to Eric F. Kozlowski, granted Dec. 12, 1989 and assigned to the assignee of the present invention, discloses the use of a similar plastic locator strip for properly positioning upholstery fabric in relation to a seat cushion in the manufacture of a seat. Kozlowski '828, however, teaches the concept of providing a strip which is entirely removable from the seat. Kozlowski discloses a locator strip designed to have these attributes, which strip includes an insertion portion adapted to be inserted between the sewn together edges of the fabric covers. The insertion portion has a plurality of spaced apart, finger-like projections joined together at their distal ends by thin transverse filament. The fingers and filament define a plurality of openings or pockets for accommodating the stitches of the seat. After the covers have been properly joined to the cushion, the Kozlowski strip is removed by pulling on an extension portion of the strip, causing the sections of filament between the fingers to pull against the stitches and break for intended removal with the remaining portions of the strip.

Although Kozlowski discloses the concept of a completely removable strip, actual use of such a strip has shown that the sections of filament between the fingers offer too great of a resistance to breakage so as to loosen or damage the stitching of the seat when removing the strip. Furthermore, the filament sections have a tendency to break in more than one location between the fingers causing small pieces of filament material to remain in the seam which must be removed manually in a separate operation.

Accordingly, there is still a need in the industry for a locator strip that will not damage the stitching of the seat upon removal nor leave any portion of the strip intact.

SUMMARY OF THE INVENTION AND ADVANTAGES

A removable positioning strip assembly for upholstering a foam cushion member with two fabric covers, each of the covers having edges adapted to be sewn together and received into an elongated slot in the cushion member. The strip assembly comprises insert means adapted to be secured between the sewn edges of the two covers for positioning the edges of the two covers within the slot of the cushion member; extension means extending outwardly from the insertion means for receiving a pulling force in a direction away from the insertion means; the insertion means including detachment means for allowing the insertion means to unitarily detach from the two covers in response to a pulling force applied to the extension means whereby the strip assembly is entirely removed in one piece from the two covers and the cushion members; and characterized by the detachment means having preselected discrete locations of detachment that are at least partially severed and are of lesser strength than all other portions of the detachment means for causing the detachment means to preferentially yield at the discrete locations in response to the applied pulling force.

The subject invention overcomes the deficiencies of the prior art locator strips by providing novel structure which allows complete removal of the locator strip while not causing damage to the fabric stitches.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
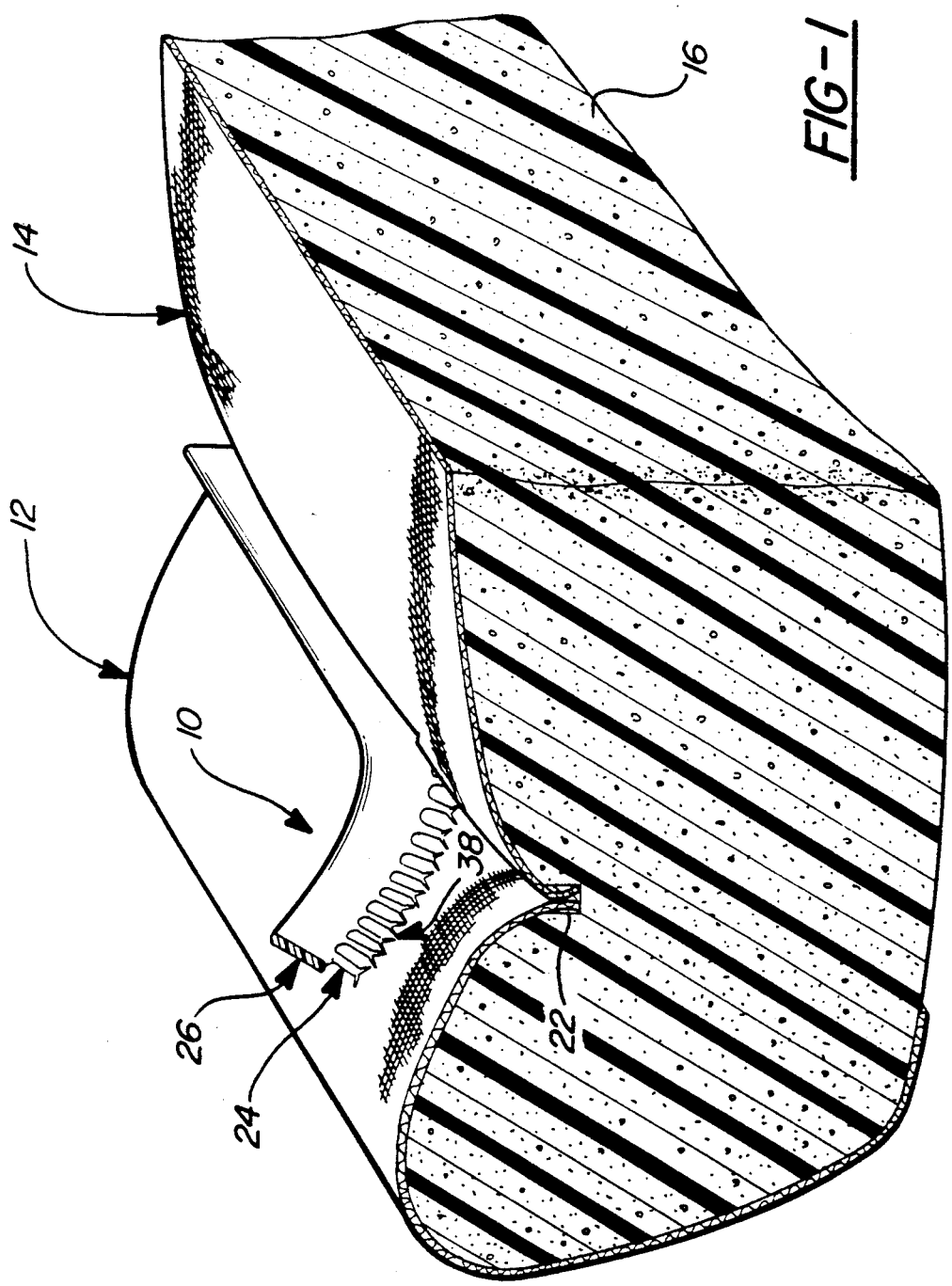
FIG. 1 is a perspective view of the subject locator strip partially detached from an upholstered cushion.

Referring to the Figures, wherein like numerals indicate like corresponding parts throughout the several views and primed numbers are used to differentiate between equivalent but alternative structure, a locator strip assembly is generally shown at 10. The locator strip 10 is particularly adapted for positioning two fabric covers, generally indicated at 12 and 14 in FIGS. 1, 5 and 6, upon a foam seat cushion 16.

Preferably, the fabric covers 12 and 14 are of different colors or patterns to present an aesthetically attractive upholstered vehicular seat. Respective edges 18,20 of the covers 12,14 are adapted to be sewn together, with the sew seam deposited in an elongated slot 22 provided in the cushion 16. In this manner, the loose edges 18,20 are embedded in the cushion with the two covers 12,14 extending laterally from the sew seam leaving an attractively upholstered cushion 16.

Figure 4:
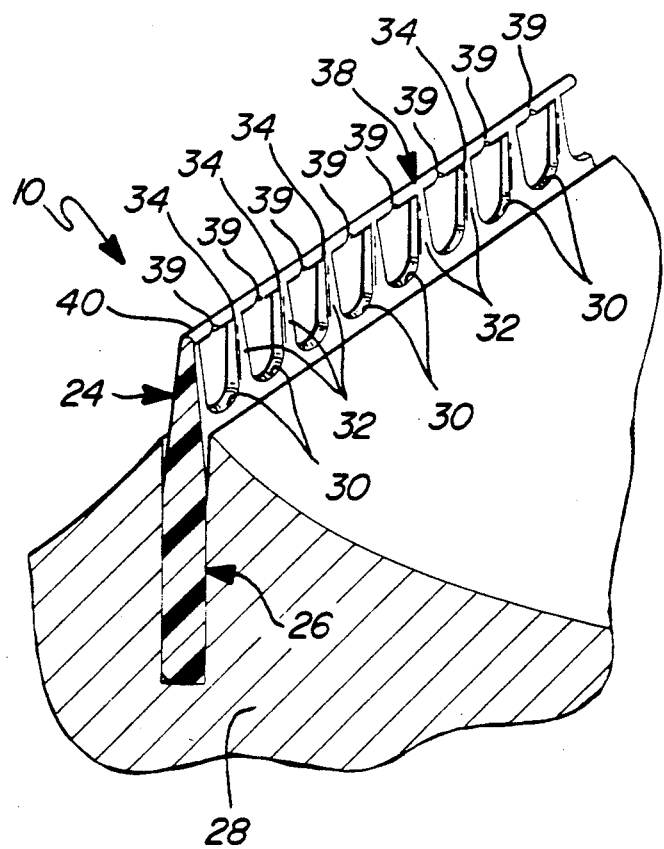
FIG. 4 is a perspective view of the locator strip supported in an automated upholstered tool.
Figure 5:
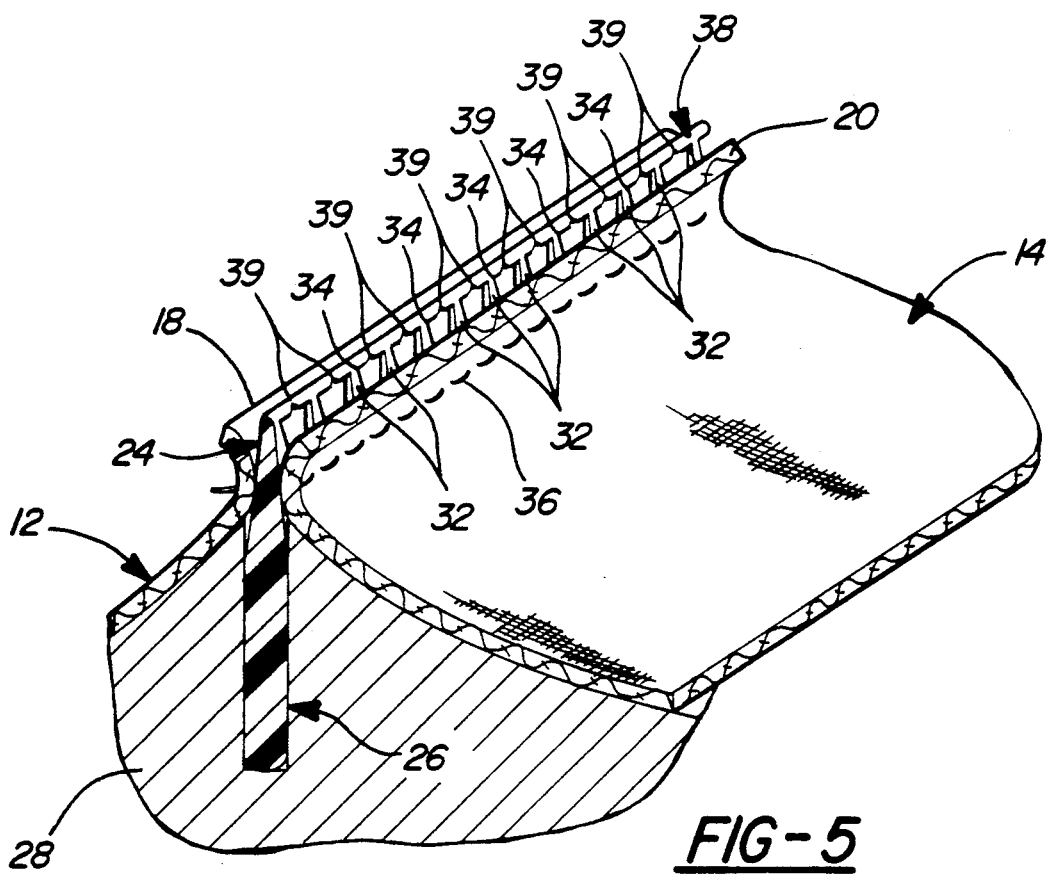
FIG. 5 is a perspective view of the locator strip sewn between the edges of two fabric covers and supported in the upholstering tool.

The locator strip 10 includes an insert means, generally indicated at 24 in FIGS. 2–7, which is adapted to be secured between the edges 18,20 into the slot 22 in the cushion 16. As best shown in FIG. 5, the insert means 24 is sewn, or stitched, between the edges 18,20 of the two covers 12,14 at the same time as the two covers 12,14 are sewn together.

An extension means, generally indicated at 26, extends outwardly from the insert means 24 for receiving a pulling force in a direction away from the insert means 24. As shown in FIG. 4 and 5, the extension means 26 is also adapted to be supported in an automated upholstering tool 28 moveable toward and away from the cushion 16 during the automatic upholstery process, as will be described in greater detail subsequently. The extension means 26 has a generally flat rectangular cross section with rounded edges. The extension means 26 extends longitudinally of the locator strip 10.

Figure 2:
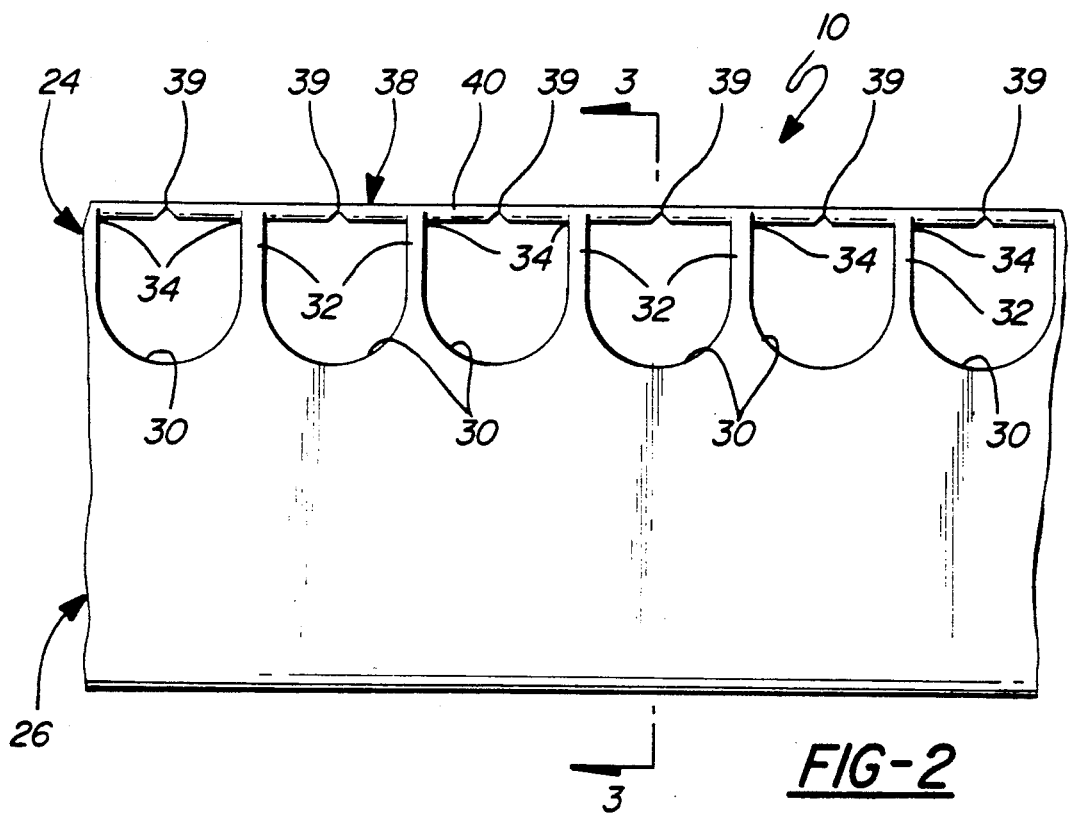
FIG. 2 is a front view of the subject locator strip.
Figure 3:
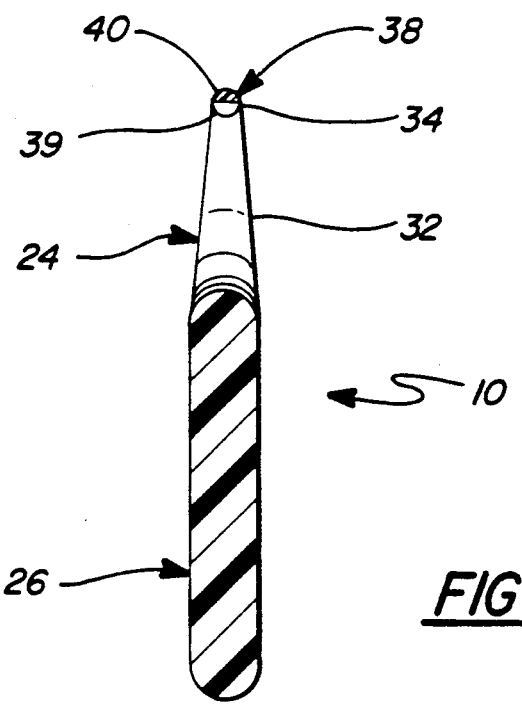
FIG. 3 is a cross-sectional end view of the locator strip taken along lines 3—3 of FIG. 2.
Figure 7:
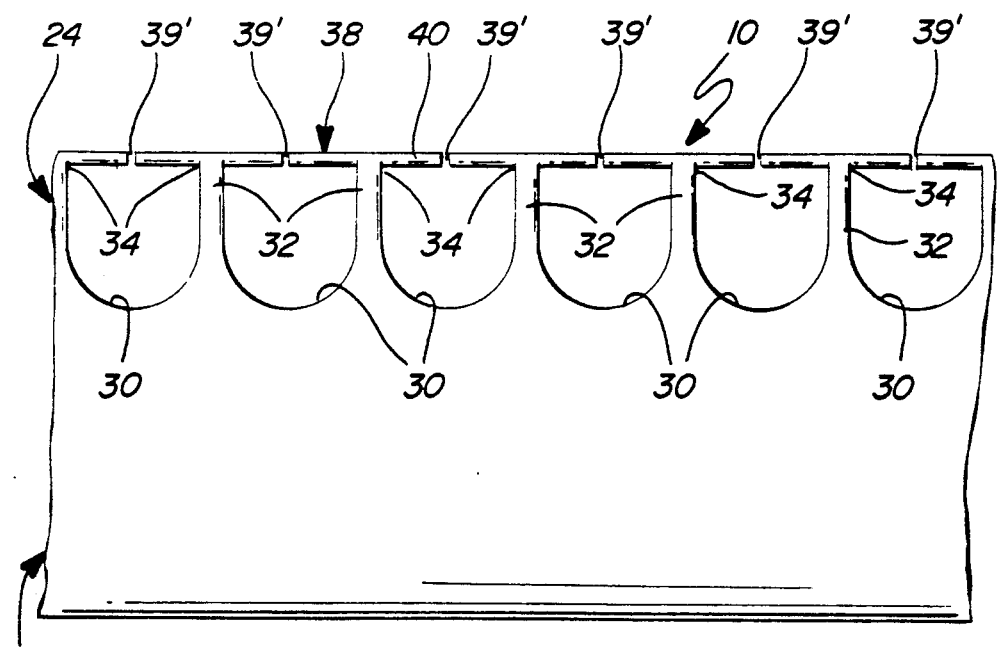
FIG. 7 is a front view of an alternative locator strip.

As best shown in FIGS. 2, 4 and 7, the insert means 24 includes an array of U-shaped pockets 30 opening in a direction away from the extension means 26. Each adjacent pocket 30 is separated by a finger-like projection 32 which extends from the extension means 26 to a distal end 34. The projections 32 are approximately one sixth (1/6) the longitudinal span of the pockets 30. The base of the projections 32, adjacent extension means 26, flare outwardly to follow the contour of the U-shaped pockets 30.

The pockets 30 form empty spaces through which a thread 36 can pass in order to stitch the two covers 12,14 together. That is, each time the thread 36 passes between the two covers 12,14, it forms a discretely fastened location. The array of stitches, therefore, form a plurality of spaced discretely fastened locations which are always within the pockets 30. The thread 36 never passes through the locator strip 10, but around the projections 32 and through the open pockets 30. As will be appreciated, between each fastened location where the thread 36 passes between the two covers 12,14, void segments, or unfastened areas, are created. The projections 32, therefore, extend through some or all of these void segments. That is, because the distance between adjacent fasten locations of the thread 36 may vary, more or less than one fastened location may be disposed through any one pocket 30.

The insert means 24 includes detachment means, generally indicated at 38, for allowing the insert means 24 to unitarily detach from the two covers 12,14 in response to a pulling force applied to the extension means 26. In other words, the detachment means 38 comprises structure enabling the locator strip 10 to be removed in one piece from the two covers 12,14 and the cushion 16 without leaving any portions remaining underneath the fabric covers 12,14 or within he seams.

The detachment means comprises a transverse element 40 responsive to the pulling force on the extension means 26 for unsecuring the insert means 24 from the two covers 12,14. The element 40 resembles an elongated filament of substantially constant cross section fixedly attached adjacent the distal ends 34 of the projections 32 to enclose the pockets 30 and fully surround the fastened locations where the two covers 12,14 are sewn together. The diameter of the filament 40 is approximately one sixteenth (1/16) the longitudinal span of the pockets 30 and approximately one third (⅓) the longitudinal span of the projections 32. The transverse filament 40 is formed with a plurality of preselected discrete locations of detachment 39,39' that are at least partially severed and are of lesser strength than all other portions of the detachment means 38. A single discrete location of detachment 39,39' is provided to each section of filament 40 extending between adjacent finger-like projections 32 and may take the form of a notch or constriction in the filament 40 as shown in FIGS. 1–5, or a through-cut 39' as shown in FIG. 7 in which the filament sections are entirely severed. Both the notches 39 and cuts 39' weaken the filaments 40 at a single location or site.

The filament is disposed on the opposite side of the sew seam from the extension means 26 so that as the extension means 26 is pulled to detach the locator strip 10 from the sew seam, the sections of filament 40 between adjacent finger-like projections 32 pull against the fastened thread of the seam associated therewith and cause the filament sections to yield or break (if notched) and spread apart at the discrete detaching locations 39 or 39'. The discrete locations of attachment 39 or 39' assure that each section of filament will yield at one location only and that the yielded filament halves will remain attached to their associated finger-like projection 32. The filament 40 then pulls through the sew seam as the broken or notched portions deflect around the fastened thread 36 locations and through the void segments therebetween without leaving any portion of the locator strip 10 behind the sew seam in the groove 22 of the cushion 16. As illustrated in FIG. 1, the filament 40 remains attached to the distal ends 34 of each of the projections 32 during and after removal.

Preferably, the subject locator strip 10 is fabricated from a homogeneous organic polymeric material, such as medium density polyethylene.

Turning now to the preferred method for covering a cushion 16 with fabric covers 12,14, the upholstering operation incorporating the locator strip 10 will be addressed presently. The elongated slot, or groove, 22 is first formed in the cushion 16 in the exact location desired to receive the sew seam between the two covers 12,14. The locator strip 10 is then positioned between the edges 18,20 of the two covers 12,14. The edges 18,20 of the covers 12,14 are fastened together about the insert means 24 of the locator strip 10 using the thread 36 by passing in and out between the covers 12,14 in a typical sewing fashion. As mentioned above, the thread 36 passes through the pockets 30 and around the projections 32. The pockets 30 are preformed during the manufacture of the strip 10 as are the notches 39 or cuts 39' in the filament 40.

Figure 6:
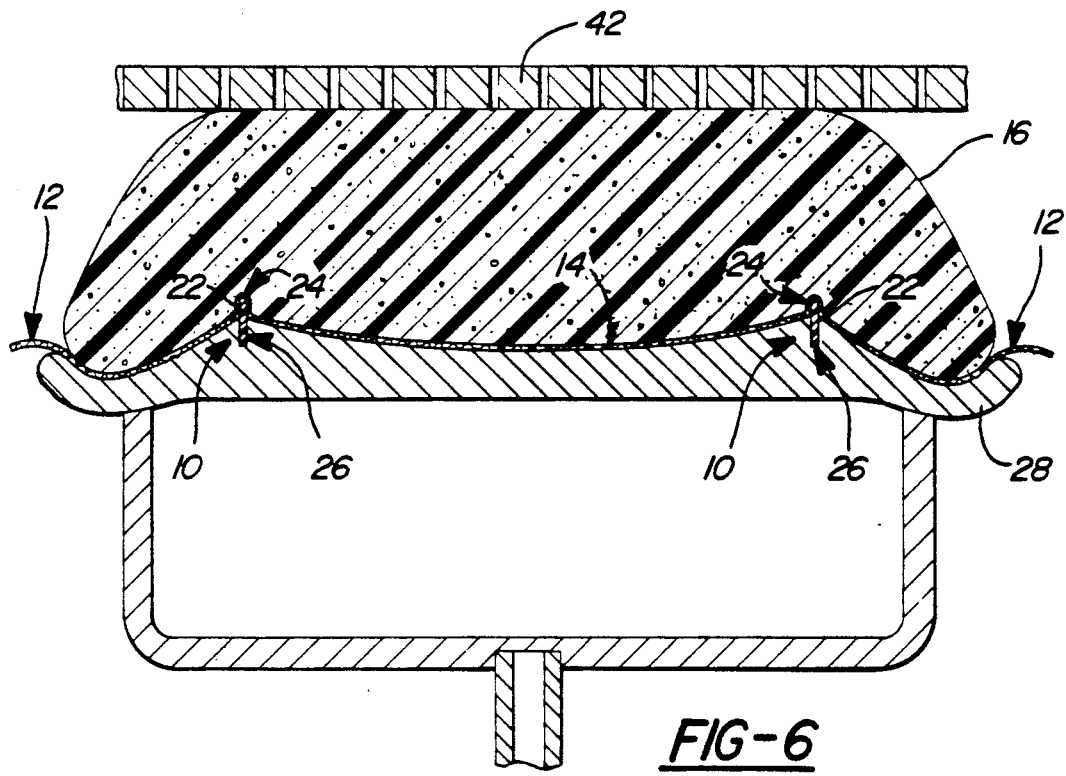
FIG. 6 is a cross-sectional view of an automated upholstering installation including two locator strips positioning three fabric covers on a cushion.

The extension means 26 of the locator strip 10 is then supported in an automated upholstering tool 28 which preferably takes the form of a heatable mold for activating a heat sensitive bonding agent to bond the fabric covers 12,14 to the cushion 16. As shown in FIG. 6, the cushion 16 may be supported adjacent a suction plate 42 in an orientation facing the tool 28. The tool 28 and suction plate 42 are then moved toward each other, relatively, until the insert means 24 penetrates the slot 22 in the cushion 16 to exactly position the covers 12,14 upon the cushion 16. The fabric covers 12,14 are next adhesively bonded to the outer surface of the cushion 16, as described above or in any other manner well known in the art.

Once the fabric covers 12,14 have been bonded to the exterior of the cushion 16, as shown in FIG. 1, the seat assembly is removed from the automatic upholstering equipment and the locator strip 10 remains secured to the sew seam and partially embedded in the groove 22. As soon as the bonding agent between the fabric covers 12,14 and the cushion 16 has sufficiently cured, the locator strip 10 is removed by applying a pulling force upon the extension means 26 in a direction away from the insert means 24 and the sew seam. With this, the filament 40 of detachment means 38 yields or fractures in the single discrete detaching location 39 or 39' provided between every two adjacent projections 32 and the filament 40 is pulled through the void segments between the fastened thread 36 locations. In other words, the filament 40 never becomes detached from the distal ends 34 of each of the projections 32. Instead, it breaks (if notched) or simply spreads apart at one location 39 or 39' between adjacent projections 32 and the broken segments deflect around the thread 36 stitches and slide, with the projections 32, through the void segments in the sew seam. In this manner, the entire locator strip 10 is removed from the two covers 12,14 and the cushion 16 so that no portion is left embedded in the slot 22.

The end result of upholstering a cushion 16 by utilizing the subject locator strip 10 results in an attractive and comfortable seat due to the perfectly orientated fabric covers 12,14 and the absence of any solid portion of the locator strip 10 left embedded in the cushion 16 below the covers 12,14. The notches 39 or cuts 39' also lessen the force required to remove the strip 10 so as to not loosen or damage the stitches of the sewn together covers 12,14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A removable positioning strip assembly (10) for upholstering a foam cushion member (16) with two fabric covers (12,14), each of the covers (12,14) having edges (18,20) adapted to be sewn together and received into an elongated slot (22) in a cushion member (16), said assembly (10) comprising:

insert means (24) for securement between the sewn edges (18,20) of the two covers (12,14) for positioning the edges (18,20) within the slot (22) of the cushion member (16);

extension means (26) extending outwardly of said insert means (24) for receiving a pulling force in a direction away from said insert means (24);

said insert means (24) including detachment means (38) having preselected discrete locations of detachment (39,39') that are at least partially severed and are of lesser strength than all other portions of said detachment means (38) for causing said detachment means (38) to preferentially yield at said discrete portions (39,39') in response to the applied pulling force for allowing said insert means (24) and said detachment means (38) to detach unitarily from the two covers (12,14), whereby said strip assembly (10) is entirely removed as one piece from the two covers (12,14) and the cushion member (16).

2. An assembly (10) as set forth in claim 1 further characterized by said insert means (24) comprising a plurality of spaced apart finger-like projections (32) extending from said extension means (26) to distal ends (34) thereof and defining an array of pockets (30) between said projections (32).

3. An assembly (10) as set forth in claim 2 further characterized by said detachment means (38) comprising a transverse element (40) fixedly disposed on said distal ends (34) of said projections (32).

4. An assembly (10) as set forth in claim 3 further characterized by said preselected locations of detachment (39,39') comprising a single notch (39) formed in said transverse element (40) between adjacent said finger-like projections (32).

5. An apparatus (10) as set forth in claim 3 further characterized by said preselected locations of detachment (39,39') comprising a single through-cut (39') formed in said transverse element (40) between adjacent said finger-like projections (32).

* * * * *